United States Patent
Ko

[11] Patent Number: 6,156,287
[45] Date of Patent: Dec. 5, 2000

[54] METHOD FOR PREPARING PAN-BASED ACTIVATED CARBON FABRICS

[75] Inventor: Tse-Hao Ko, Taipei, Taiwan

[73] Assignee: National Science Council, Taipei, Taiwan

[21] Appl. No.: 09/151,500

[22] Filed: Sep. 11, 1998

Related U.S. Application Data

[63] Continuation-in-part of application No. 08/897,287, Jul. 21, 1997, abandoned, which is a continuation of application No. 08/446,220, May 22, 1995, abandoned.

[51] Int. Cl.[7] .............................. D01F 9/12; D02G 3/00; B01J 20/02
[52] U.S. Cl. ........................ 423/447.1; 423/447.6; 423/447.4; 423/447.7; 428/367; 502/432
[58] Field of Search ................. 502/432; 423/447.1, 423/447.6, 447.4, 447.7; 428/347

[56] References Cited

U.S. PATENT DOCUMENTS

| | | | |
|---|---|---|---|
| 3,656,882 | 4/1972 | Riggs | 8/115.5 |
| 3,656,883 | 4/1972 | Riggs | 8/115.5 |
| 3,813,219 | 5/1974 | Diedwardo | 8/115.5 |
| 3,820,951 | 6/1974 | Diedwardo | 8/115.5 |
| 3,850,876 | 11/1974 | Diedwardo | 260/45.7 |
| 3,923,950 | 12/1975 | Gump | 264/182 |
| 4,002,426 | 1/1977 | Chenevey | 8/115.5 |
| 4,004,053 | 1/1977 | Gump | 427/379 |
| 4,237,108 | 12/1980 | Fukuhara | 423/447.6 |
| 4,285,831 | 8/1981 | Yoshida | 423/447.6 |
| 4,295,844 | 10/1981 | Warner | 8/115.5 |
| 4,301,136 | 11/1981 | Yamamoto | 423/447.6 |
| 4,412,937 | 11/1983 | Ikegami et al. | 423/447.5 |
| 4,534,807 | 8/1985 | Field et al. | 148/20.3 |
| 4,618,469 | 10/1986 | Ogawa | 264/182 |
| 4,921,686 | 5/1990 | Yoshida et al. | 423/447.8 |
| 5,153,055 | 10/1992 | Ko | 428/224 |
| 5,154,778 | 10/1992 | Papazian | 148/703 |
| 5,269,984 | 12/1993 | Ono et al. | 264/29.2 |
| 5,474,836 | 12/1995 | Nishimura et al. | 428/229 |

OTHER PUBLICATIONS

Ko, Tse–Hao, Journal of Applied Polymer Science vol. 47, pp. 707–715 (1993).
Textron Specialty Materials Aox Stabilized Acrylic Fiber (no date).
Asashi Chemical Industry Co. Lastan (no date).
Pyromex Toho Rayon Co. Ltd. (no date).
Pyron, Zoltek Corp., Jun. 1995.
RK Panox, M. RK Carbon International Group (no date).

*Primary Examiner*—Steven P. Griffin
*Assistant Examiner*—Jonas N. Strickland
*Attorney, Agent, or Firm*—Ladas & Parry

[57] ABSTRACT

PAN-based oxidized fabrics are activated by heating at a temperature of 700–1000° C. for 1 minute to 1 hour with the introduction of moisturized carbon dioxide gas. The resulting PAN-based activated fabrics are suitable for use as adsorption materials.

14 Claims, 1 Drawing Sheet

METHOD FOR PREPARING PAN-BASED ACTIVATED CARBON FABRICS

This is a continuation-in-part of application Ser. No 08/897,287 filed on Jul. 21, 1997, now abandoned, which is a continuation of Ser. No. 08/446,220 filed May 22, 1995, now abandoned, claims the benefit thereof and incorporates the same by reference.

BACKGROUND OF THE INVENTION

The present invention relates to a method for preparing polyacrylonitrile (PAN)-based activated carbon fabrics for providing adsorption and, in particular, to a method for preparing PAN-based activated carbon fabrics from a PAN-based oxidized fabric.

In U.S. Pat. No. 4,362,646 issued to Ikegami et al, it is disclosed that PAN-based activated carbon fibers are superior to pitch-based, cellulose-based and phenol resin-based activated carbon fibers in their mechanical strength and their ability to aborb due to the nitrogen atoms contained therein.

The inventors of the present invention, in Journal of Material Science Letters (Vol. 1, pp. 6–8, 1992), disclose a process for preparing PAN-based activated carbon fibers. The process includes first preparing oxidized carbon fibers by shrinking polyacrylonitrile fiber bundles in an oxidizing process, followed by activating the oxidized carbon fibers in a carbon dioxide atmosphere at a temperature of 900° C. The PAN-based activated carbon fibers thus prepared are found to have moderate tensile strength (above 0.46 Gpa), and excellent adsorbing ability to absorb dyestuffs dissolved in wastewater.

In addition, in Carbon (Vol. 30, pp. 647–655, 1992), the inventors also disclose a process for the preparation of PAN-based carbon fibers in which polyacrylonitrile fiber bundles are oxidized, and then activated at 880° C. by using a carbon dioxide gas as an activating gas. Thus produced activated carbon fibers have a BET surface area higher than 500 $m^2/g$ and a tensile strength higher than 0.5 Gpa.

PAN-based activated fibers have superior adsorbing ability and mechanical strength. It is desirable to weave PAN-based activated fibers into fabrics used as adsorption material for waste gas and waste water. However, if PAN-based activated carbon fibers are to be woven into a fabric, the following complicated process is required: PAN-based fiber bundles→oxidization→activation→activated carbon fiber bundles→carding→spinning→activated carbon yarn→weaving→activated carbon fabrics. However, as activated carbon fibers are fragile, permitting an elongation of less than 1.5%, they are easily broken in the carding, spinning and weaving process, and therefore are not suitable for being woven into fabrics, but only suitable for forming of fiber bundles, non-woven fabrics, papers or felts.

In Japan Laid-open Patent No. 60-231834, a process for preparing activated carbon fabrics by using fabrics woven from a first fiber including a cellulose or phenol resin fiber, and a second fiber is disclosed. The first fiber can be activated, thereby allowing the resulting activated carbon fabrics to have adsorption. However, as the mechanical strength of first fibers will, during their activation process, degrade, the resulting products display poor mechanical strength.

SUMMARY OF THE INVENTION

It is therefore an object of the invention to provide a process for preparing PAN-based activated carbon fabrics from PAN-based oxidized fabrics, but not from PAN-based activated carbon fibers.

In the invention, a PAN-based oxidized fabric is activated by heating at a temperature of 700–1000° C. for 1 minute to 1 hour with the introduction of moisturized carbon dioxide gas to form a PAN-based carbon fabric.

According to an aspect of the invention, the raw material, PAN-based oxidized fabrics is a readily available fireproof fabric, According to another aspect of the invention, the PAN-based oxidized fabric, when activated in a high temperature furnace, is supported by tension rollers to control shrinkage.

According to further an aspect of the invention, the high temperature furnaces where the activation of the PAN-based oxidized fabric is carried out, are protected with inert gas at their inlet and outlet.

The above and other objects and features of the present invention will become apparent from the complete description of this specification.

DETAILED DESCRIPTION OF THE INVENTION

Figure 1:
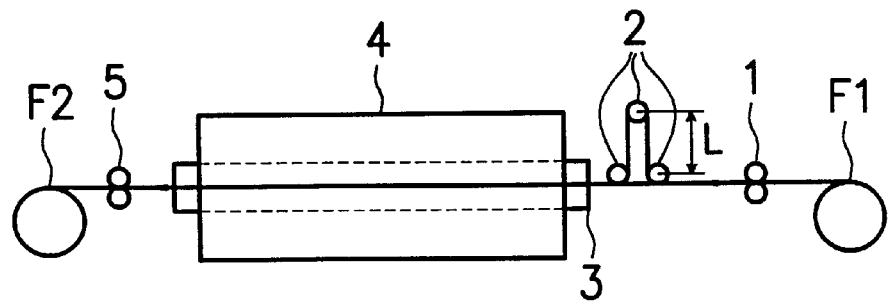
FIG. 1 illustrates the preparation of PAN-based activated carbon fabric.

The raw materials used for the preparation of PAN-based activated carbon fabrics of the invention are PAN-based oxidized fabrics. A source of the raw materials are commercially available fireproof fabrics for fire-fighting which contains 40–100 wt % of PAN-based oxidized fibers. These fireproof fabrics are manufactured, for example, by subjecting polyacrylonitrile bundles (each bundle includes at least 20,000 fibers) to a stabilization process, and then forming the stabilized PAN fibers into fabrics by weaving or by a non-weaving method. The stabilization process includes calendaring and simultaneously heating a plurality of polyacrylonitrile bundles at a temperature ranging from 150° C. to 400° C. for 30 minutes to 20 hours to allow for cyclization reaction. The stabilization leads to the formation of ladder polymers, due to additional polymerization of the nitrile side groups and forms stabilized, namely oxidized, PAN fibers having a cyclization index of at least 50%, an oxygen content of at least 6% and a density of 1.33–1.55 g/ml. Due to having a ladder polymer structure, the resulting stabilized fibers display fireproof characteristics and acid base resistance. Other characteristics of the stabilized PAN fibers are disclosed in U.S. Pat. No. 5,153,055 issued to the inventor of the present invention.

Note that the PAN-based oxidized fabrics suitable for use in the invention are fabrics formed from polyacrylonitrile fibers which have been subjected to oxidization, namely stabilization, but not PAN fabrics which are formed directly from PAN fibers which were not subjected to oxidization previously. The reason for using oxidized fabrics, and not using PAN fabrics, to develop activated carbon fabrics is that the cyclization of PAN fibers of the PAN fabrics during the subsequent stabilization process is associated with a large exotherm which leads to the breakdown of the ladder polymer and to an overabsorption of oxygen, causing a worsening of its mechanical properties and defects in the microstructure of the oxidized fibers. These reactions result in the fusing of these fabrics. To eliminate this problem, according to the invention, PAN fibers are first oxidized in a tensioned state to prevent the thermal breakdown, and then woven into fabrics. The oxidized fibers thus formed are rather flexible, permitted an elongation greater than 10%, and thus are easily to be woven into oxidized fabrics by conventional weaving methods.

According to the invention, the next step is to heat the PAN-based oxidized fabrics at a temperature of 700–1000° C. for 1 minute to 1 hour to activate the fabrics. During the carbonization stage, due to the release of non-carbon elements and the condensation of the ladder polymer, in the polyacrylonitrile fiber, carbon basal planes are gradually formed and piled along the axial direction of the fibers. The piling effect becomes more significant when the temperature used is increased, and thus the density of the fiber increases when the temperature for carbonization is increased. However, when the carbonization temperature is raised beyond a certain temperature, usually a temperature between 700° C. and 1200° C., the density abruptly decreases. This is because the outer layer of the fibers has become graphite-like, thus causing the formation of closed pores from open pores (Gibson, 18th Int. SAMPE SYMP., 18. 165; Abhiranana et al, 1987, J. Mater. Sci., 22, 3864; Tse-Hao Ho, J. Appl. Polym. Sci., 43, 589; Tse-Hao Ho, Carbon, 30,647, and Polym. Eng. Sci. 31. 1618, J. Appl. Polym. Sci., 42, 1949). It has been found that the density of PAN-based oxidized fabric increases from 1.645 g/ml to 2.153 g/ml when the activation temperature is raised from 700° C. to 1000° C. and abruptly goes down when the temperature exceeds 1000° C., indicating that if an activation temperature greater than 1000° C., is used, the open pores will close, causing a reduction of the adsorption of exhaust gas or wastewater of the PAN-based activated carbon fabrics.

Fabric is constituted by yarn, which is made of fiber. The fiber is characterized by the structure of its carbon basal planes. At the high temperatures of 700° C. to 1000° C. used during activation, the PAN-based fabric will shrink naturally, rearranging the carbon basal planes in the fiber turn into a random order. The consequence of this rearrangement is that the strength of the fabric will be decreased.

In addition, when the PAN-based fabrics shrink, the yarn strands of the fabric tend to be very close to each other, that is, the space between the yarn strands is smaller. Therefore when the activated PAN-based carbon fabric is used in the purification treatment for waste gas or waste water, due to the smaller space between the yarn strands, the waste gas or waste water can not easily pass through the space between the yarn strands. Thus the efficiency of the purification treatment provided by the activated carbon fabric is adversely affected.

In order to obtain a PAN fabric without the above-mentioned shortcomings, the shrinkage of the PAN fabric during activation should be controlled. According to the present invention, during activation, the shrinkage of the PAN-based fabric is controlled in two directions.

Referring to FIG. 1, a roll of the PAN-based fireproof fabric F1 is first passed through a pair of rollers 1, then a set of tension rollers 2, and finally a furnace 4. The PAN-based fireproof fabric F1 is activated into an activated carbon fabric in the furnace 4 and is passed through another pair of rollers 5, and finally taken up by a take up roller (not shown) as a roll of activated carbon fabric F2.

In order to obtain a final activated carbon fabric with uniform tension, the present invention uses two kinds of tension controlling devices, i.e., a set of tension rollers 2 and a pair of weft yarn tension controlling devices 3.

In the direction of fabric transport, the PAN-based fabric (a fireproof fabric) is supported between the rollers 1 and the rollers 5, and is also supported by the tension rollers 2. The tension of the warp yarn can be adjusted by changing the rotation speeds of the rollers 1 and 5, and can also be further adjusted by the changing distance L shown in FIG. 1. In this way, the warp yarn of the PAN-based fabric can have a uniform and constant tension. Thus, the shrinkage of the warp yarn can be controlled to limit it to a desired value.

Figure 2:
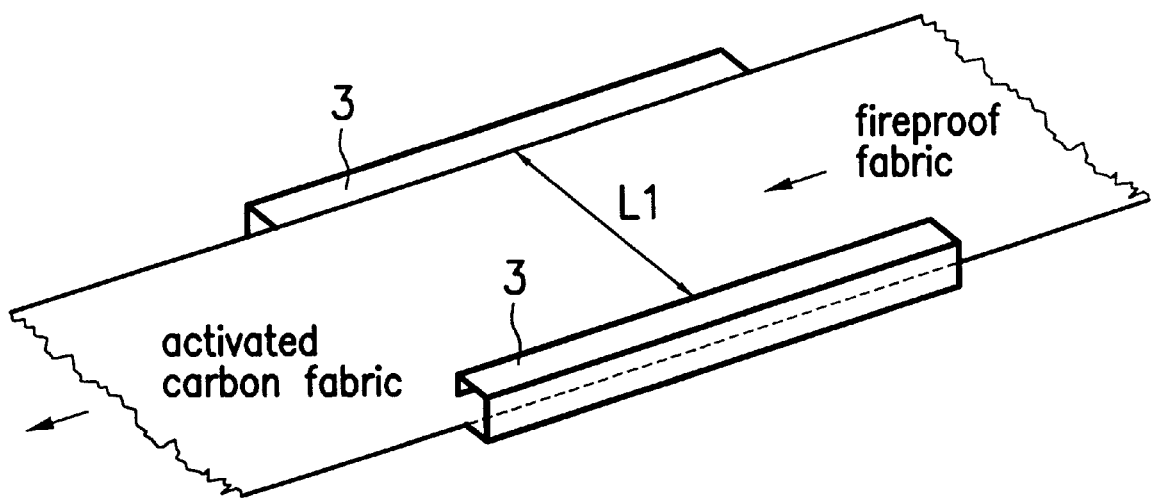
FIG. 2 illustrates how the tension of the PAN-based fabric is provided between two weft yarn tension controlling devices.

In the direction perpendicular to the fabric transport, the PAN-based fabric (a fireproof fabric) is supported between two weft yarn tension controlling devices 3. The tension of the weft yarn can be adjusted by changing the distance L1 shown in FIG. 2. In this way, the weft yarn of the PAN-based fabric can have a uniform and constant tension. Thus, the shrinkage of the weft yarn can be controlled to limit it to a desired value.

Preferably, the shrinkage of the warp yarn and the weft yarn of the PAN-based fabric is controlled to be limited to less than 30% respectively.

The major object of such shrinkage control is to prevent the randomization of the carbon basal planes, thus increasing the orderliness of the orientation of the carbon basal planes, therefore, the strength of the fabric will be increased. Another object is to prevent the yarn strands in the fabric from being too close or too dense, so that, the waste gas or waste water can easily pass through the space between the yarn.

The activation process of the invention is carried out in a high temperature furnace by the introduction of an activating gas. In this invention, moisturized carbon dioxide gas is used as the activating gas. The moisturized carbon dioxide gas can be produced by supplying the carbon dioxide gas through a water tank.

Preferably, the water temperature in the water tank is maintained at about 25° C. to 60° C., and more preferably 25° C. to 30° C. The moisturized carbon dioxide gas is then guided to the inlet of the high temperature furnace via pipelines. Note that, according to the invention, it is not necessary to use a mixture of carbon dioxide gas and steam as an activating gas, as in the prior art.

To avoid the self-combustion of the PAN-based oxidized fabrics caused by the volatization of a large amount of small molecules from the fabrics during the activation process, the inlet and outlet of the high temperature furnaces are protected with inert gas such as nitrogen or argon gas. Also, in order to avoid the shrinkage of the fabrics during activation process, the fabrics to be activated are supported on tension rollers. The shrinkage the resulting activated fabrics is preferably controlled to be less than 30%.

This invention will be more clearly understood by referring to the following illustrative examples.

EXAMPLE 1

Fireproof fabrics obtained from R. K. Carbon Co., Ltd., England, were activated in a high temperature furnace at 700° CC. for 20 minutes. Moisturized carbon dioxide gas was introduced into the furnace at a predetermined flow rate, and argon gas was introduced in the inlet and outlet of the furnace for protection. The shrinkage of the fireproof fabrics was controlled in the warp yarn direction to less than 30% by using tension rollers. The properties of the resulting PAN-based oxidized fabrics are summarized in Table 1.

EXAMPLE 2

The same conditions and procedures as in Example 1 were used, except that the activation was conducted at 900° C. The properties of the resulting fabrics are summarized in Table 1.

EXAMPLE 3

The same conditions and procedures as in Example 1 were used, except that the activation was conducted at 1000° C. The properties of the resulting fabrics are summarized in Table 1.

EXAMPLE 4

The same conditions and procedures as in Example 1 were used, except that the activation was conducted at 1100° C. The properties of the resulting fabrics are summarized in Table 1.

COMPARATIVE EXAMPLE 1

The same conditions and procedures as in Example 1 were used, except that the activation was conducted at 1200° C. The properties of the resulting fabrics are also summarized in Table 1.

COMPARATIVE EXAMPLE 2

The same conditions and procedures as in Example 1 were used, except that the activation time was 5 minutes. The properties of the resulting fabrics are summarized in Table 1.

COMPARATIVE EXAMPLE 3

The same conditions and procedures as in Example 1 were used, except that activation time was 40 minutes. The properties of the resulting fabrics are summarized in Table 1.

control the shrinkage of the warp yarn and weft yarn to be below 30% respectively.

EXAMPLE 6

The conditions and procedures of Comparative Example 2 were used, except that tension was applied to the fireproof fabrics both in the warp yarn and weft yarn direction to control the shrinkage of the warp yarn and weft yarn to be below 30% respectively.

EXAMPLE 7

The conditions and procedures of Comparative Example 3 were used, except that tension was applied to the fireproof fabrics both in the warp yarn and weft yarn direction to control the shrinkage of the warp yarn and weft yarn to be below 30% respectively.

EXAMPLE 8

The conditions and procedures of Example 3 were used, except that tension was applied to the fireproof fabrics both in the warp yarn and weft yarn direction to control the shrinkage of the warp yarn and weft yarn to be below 30% respectively.

COMPARATIVE EXAMPLE 4

The same conditions and procedures as in Example 3 were used except that the shrinkage of the fireproof fabrics was not controlled by any tension and the fabrics were allowed to shrink freely.

From the above examples, it can be seen that the activated carbon fabric that has been subjected to tension controlling

TABLE 1

| Example | Activation Temp. (° C.) | BET surface area (m²/g) | Average pore size (nm) | Tensile strength* (GPa) | Tensile strength coefficient* (GPa) | Density | Nitrogen content (wt %) |
|---|---|---|---|---|---|---|---|
| 1 | 700 | 300 | 0.40 | 0.8 | 32 | 1.645 | 13.2 |
| 2 | 900 | 420 | 0.49 | 1.0 | 42 | 1.749 | 11.8 |
| 3 | 1000 | 1200 | 0.56 | 0.6 | 28 | 2.153 | 5.5 |
| 4 | 1100 | 430 | 0.60 | 2.6 | 114 | 2.048 | 5.3 |
| Comp. 1 | 1200 | 370 | 0.57 | ** | ** | 1.732 | 3.7 |
| Comp. 2 | 1000 | 1000 | 0.51 | 0.9 | 38 | 2.043 | 8.3 |
| Comp. 3 | 1000 | 1600 | 0.57 | 0.4 | 42 | 2.163 | 5.0 |
| 5 | 1200 | 450 | 0.51 | ** | ** | 1.745 | 3.7 |
| 6 | 1000 | 1200 | 0.51 | 1.0 | 40 | 2.154 | 8.4 |
| 7 | 1000 | 1800 | 0.51 | 0.5 | 43 | 2.181 | 5.1 |
| 8 | 1000 | 1420 | 0.51 | 0.6 | 30 | 2.163 | 5.5 |
| Comp. 4 | 1000 | 980 | 0.49 | 0.4 | 20 | 1.680 | 5.6 |

Note:
*tensile strength and tensile strength coefficient were measured by single filament testing method for carbon fibers (JIS R7601-1980)
**Fabrics grayed, not measured.

As can be seen from the results shown in Table 1, the PAN-based activated fabrics prepared by the method of the invention have a tensile strength higher than 0.6 Gpa, a BET surface area up to 1200 m²/g, a nitrogen content higher than 0.5 wt %, an average pore size larger than 0.4 nm and a density up to 2.153 g/ml. The activated fabrics are suitable for use as adsorption materials, such as filtering materials in masks for military use.

EXAMPLE 5

The conditions and procedures of Comparative Example 1 were used, except that tension was applied to the fireproof fabrics both in the warp yarn and weft yarn direction to shrinkage in both the directions of warp and weft yarns demonstrate a higher BET value and density than the fabric controlled only in the warp direction. In addition, the activated carbon fabric that is allowed to shrink freely has inferior mechanical properties, including BET value, tensile strength and tensile coefficient, compared to the fabric that is subjected to shrinkage controlling tension.

What is claimed is:

1. A method for preparing a PAN-based activated carbon fabric, comprising the steps of:
   (a) providing a PAN-based oxidized carbon fabric having a bonded oxygen amount of less than 40%;
   (b) passing carbon dioxide through water to form an activating gas; and (c) subjecting said PAN-based oxidized carbon fabric to activation by heating in a high temperature furnace at a temperature of 700° C. to 1000° C. for 1 minute to 1 hour with the introduction of the activating gas, the high temperature furnace having an inlet and an outlet, the inlet and outlet being protected with inert gas; wherein warp yarn of the PAN-based oxidized carbon fabric is supported by tension rollers in said high temperature furnace so as to limit shrinkage of the warp yarn to a predetermined value, and weft yarn of the PAN-based oxidized carbon fabric is supported by tensioning devices in said high temperature furnace so as to limit shrinkage of the weft yarn to a predetermined value.

2. The method as claimed in claim 1, wherein said inert gas is nitrogen.

3. The method as claimed in claim 1, wherein said inert gas is argon.

4. A method as claimed in claim 1, wherein the shrinkage of the warp yarn is controlled to be limited to less than 30%.

5. A method as claimed in claim 1, wherein the shrinkage of the weft yarn is controlled to be limited to less than 30%.

6. A method as claimed in claim 1, wherein in step (b), the water is at a temperature of 25° C.–60° C.

7. A method as claimed in claim 1, wherein the PAN-based oxidized fabric is a fireproof carbon fabric.

8. A method for preparing a PAN-based activated carbon fabric, comprising the steps of:

(a) providing a PAN-based oxidized carbon fabric wherein said PAN-based fabric includes 40–100% PAN-based oxidized fibers;

(b) passing carbon dioxide through water to form an activating gas; and (c) subjecting said PAN-based oxidized carbon fabric to activation by heating in a high temperature furnace at a temperature of 700° C. to 1000° C. for 1 minute to 1 hour with the introduction of the activating gas, the high temperature furnace having an inlet and an outlet, the inlet and outlet being protected with inert gas; wherein the tension of warp yarn of the PAN-based oxidized carbon fabric is controlled by tension rollers in said high temperature furnace so as to limit shrinkage of the warp yarn to a predetermined value, and the tension of weft yarn of the PAN-based oxidized carbon fabric is controlled by tension devices in said high temperature furnace so as to limit shrinkage of the weft yarn to a predetermined value.

9. The method as claimed in claim 8, wherein said inert gas is nitrogen.

10. The method as claimed in claim 8, wherein said inert gas is argon.

11. A method as claimed in claim 8, wherein the shrinkage of the warp is controlled to be limited to less than 30%.

12. A method as claimed in claim 8, wherein he shrinkage of the weft yarn is controlled to be limited to less than 30%.

13. A method as claimed in claim 8, wherein in step (b), the water is at a temperature of 25° C.–60° C.

14. A method claimed in claim 8, wherein the PAN-based oxidized fabric is a fireproof carbon fabric.

* * * * *